July 6, 1937.  C. F. BROWN  2,086,464

PIE CRIMPER AND SEALER

Filed Oct. 26, 1936

Inventor
C. F. Brown

Patented July 6, 1937

2,086,464

UNITED STATES PATENT OFFICE 2,086,464

PIE CRIMPER AND SEALER

Charles F. Brown, Beaver, Pa.

Application October 26, 1936, Serial No. 107,680

4 Claims. (Cl. 107—49)

The device forming the subject matter of this application is adapted to be used in connection with the pie crust dough that is contained in a pan for baking.

The invention aims to provide novel means for crimping and ornamenting the edge of the pie. Another object of the invention is to provide means for sealing the crust of the pie, at its edge, to prevent leakage of juice. A further object of the invention is to provide a device which may be used to trim off the dough from the edge of the pan. Another object of the invention is to supply a structure of the class described which may be used for making a design in the central part of the pie dough.

A further object of the invention is to supply a device of the class described, the constituent parts of which may be taken apart readily for cleaning, and to provide novel means whereby those parts are held assembled detachably, when the device is not in use.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

The device forming the subject matter of this application preferably is made of metal and comprises a base 1, which is roughly semicircular in outline. In one edge, the base 1 is provided with U-shaped notches 2, located side by side, the mouths of the notches being arranged on the inwardly convexed arc of a circle, as Fig. 2 will show. The straight edge 3 of the base 1 that is opposite to the notches 2 is sharpened, so that it can be used for trimming off the layers of pie crust dough, around the periphery of a pie tin.

Figure 2:
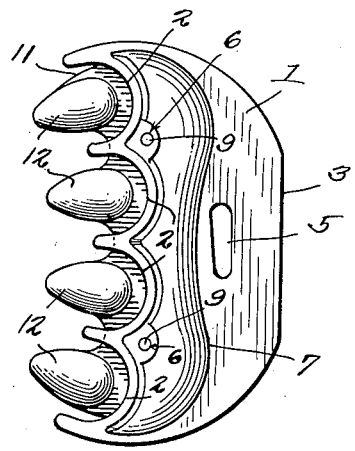
Fig. 2 is a bottom plan.

In the upper surface of the base 1, between the trimming edge 3 and the notches 2, there is a depression 4, which may be shaped like a leaf, or like any other ornamental object. An elongated hole 5 extends through the base 1 and communicates with the depression 4. When the base 1 is inverted, as shown in Fig. 2, it may be pressed down on the central part of the upper crust of a pie, and the depression 4 will form a raised design on the pie crust. The hole 5 lets the air out of the depression 4, so that the dough can rise in the depression and form the design; it also forms a rib on the leaf design of the dough; and it constitutes a means whereby the article may be hung up when not in use.

The base 1 has openings 6, spaced apart somewhat widely, and located to the rear of, and between, certain of the notches 2. In the lower surface of the base 1 there is an elongated recess 7, adapted to receive the fingers of an operator, a statement the meaning whereof will be made more clearly manifest hereinafter.

Figure 1:
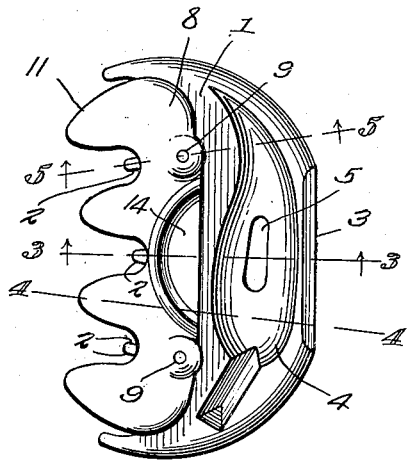
Fig. 1 shows in top plan, a device constructed in accordance with the invention.
Figure 3:
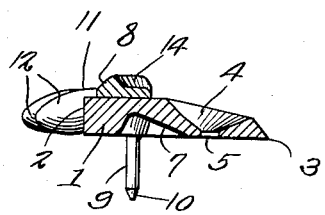
Fig. 3 is a section on the line 3—3 of Fig. 1.
Figure 4:
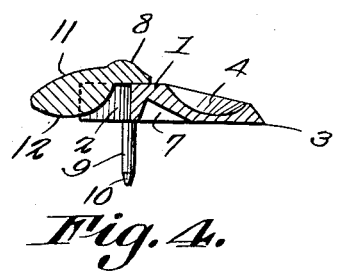
Fig. 4 is a section on the line 4—4 of Fig. 1.
Figure 5:
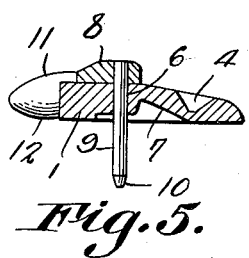
Fig. 5 is a section on the line 5—5 of Fig. 1.

A supplemental member 8 is provided, and is not so wide as the base 1, measured from front to back, as can be seen in Fig. 1. The preferred means for connecting the member 8 to the base 1 detachably embodies a pair of depending fingers or pins 9 on the member 8, which are bluntly pointed as at 10, so that they can be inserted readily into the openings 6 of the base 1. The fingers 9 diverge slightly, as in Fig. 6, and have some resiliency, and when the fingers are inserted through the openings 6 of the base 1, they will hold the member 8 securely but removably on top of the base, with the flat lower surface of the member 8 in contact with the flat upper surface of the base 1, as shown in Figs. 3, 4, and 5.

The member 8 has projections 11 which overhang the notches 2 of the base 1. The outer ends of the projections 11 are arranged on the inwardly convexed arc of a circle, parallel to the arc of a circle in which the mouths of the notches are arranged as shown in Fig. 2. The projections 11 are provided with approximately oval, depending, convexed bosses 12, which extend downwardly into the notches 2, the bosses 12 being of such size that they do not completely fill the notches, the bosses being spaced from the walls of the notches, as Fig. 2 will show.

When the device is arranged as disclosed in Figs. 1 and 2, the depending pins or fingers 9 are placed against the edge of the pie tin, and the device is pressed down on the dough that overlaps the rim of the pie tin. When the device is pressed down as aforesaid, the dough is indented and confined within the notches 2, and the bosses 12 further indent the dough. Thus, an ornamental design is formed around the rim of the pie, but forming a design is not the sole object of the invention. The bosses 12 tend to force the dough outwardly with respect to the bosses, in contact with the walls of the notches 2, and an adequate sealing is afforded. The device is shifted circumferentially of the pie tin, with the depending fingers 9 in contact with the edge of the pie tin, and in this way, a design is formed entirely around the edge of the pie, and the layers of pie crust are sealed together, to retain the juice of the body of the pie.

When the device is in use, in the position shown in Fig. 1, the fingers of the operator are received in the recess 7, and the thumb of the operator is received in a seat 14, formed in the supplemental member 8 at the rear edge thereof. The operator thus holds the supplemental member 8 on the base 1, during the operation of the device, and the supplemental member 8 will not move upwardly whilst the pie crust is being ornamented and sealed at its edge. The diverging pins or fingers 9, however, hold the parts 8 and 1 together when the article is not in use and prevent them from falling apart or becoming detached one from the other.

Preliminary to the ornamenting and sealing of the edge of the pie crust, the crust is trimmed off around the edge of the pie tin, by means of the knife edge shown at 3. As has been intimated before, the depression 4 is used to make a design on the central portion of the pie.

The article accomplishes four useful ends, in that it crimps the edge of the pie, seals the edge of the pie crust to prevent the leakage of juice, is capable of trimming the edge of the dough by means of that part shown at 3, and is capable of making a leaf design on the center of the pie, by means of the depression 4.

Figure 6:
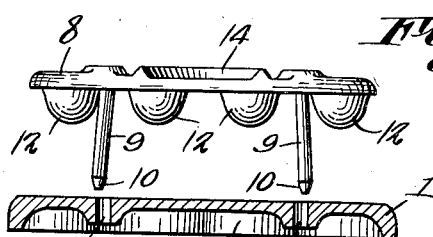
Fig. 6 is an elevation wherein the parts are separated, the base being in section.

The base 1 and the supplemental member 8 form a body, the constituent parts of which may be separated readily for cleaning, as Fig. 6 will indicate.

Having thus described the invention, what is claimed is:

1. A device of the class described comprising a body having notches in one edge, the body being provided with projections which overhang the notches, the projections being supplied with bosses extended downwardly into the notches, the area of each boss being less than the area of the notch into which said boss extends.

2. A device of the class described, including a body comprising a base having notches in one edge, and a supplemental member superposed on the base, the supplemental member being provided with projections which overhang the notches, the projections being supplied with bosses extended downwardly into the notches, the area of each boss being less than the area of the notch into which said boss extends; and means for effecting a detachable connection between the supplemental member and the base.

3. A device of the class described, constructed as set forth in claim 2, and wherein the last-specified means comprises depending, resilient, diverging fingers, the base being provided with openings for receiving the fingers, and the fingers extending below the base.

4. A device of the class described, constructed as set forth in claim 2, and wherein the last-specified means comprise depending fingers on the supplemental member, the base having openings through which the fingers pass, the fingers extending below the base and being spaced widely enough apart to act as guides for directing the device around the edge of a pie tin whilst the dough in the pie tin is being indented, sealed and ornamented by the bosses and the notches.

CHARLES F. BROWN.